United States Patent [19]

Clark

[11] 4,388,812

[45] Jun. 21, 1983

[54] VARIABLE VALVE FOR REFRIGERATION SYSTEM

[76] Inventor: Silas W. Clark, 1000 Greens Rd., #809, Houston, Tex. 77060

[21] Appl. No.: 252,937

[22] Filed: Apr. 10, 1981

Related U.S. Application Data

[60] Division of Ser. No. 18,647, Mar. 8, 1979, Pat. No. 4,285,211, which is a continuation-in-part of Ser. No. 887,445, Mar. 16, 1978, Pat. No. 4,171,619.

[51] Int. Cl.³ .............................................. F25B 15/00
[52] U.S. Cl. ...................................... 62/141; 62/483; 62/494; 62/476
[58] Field of Search ................ 62/235.1, 335, 476, 62/483, 489, 494, 147, 141

[56] References Cited

U.S. PATENT DOCUMENTS

| | | | |
|---|---|---|---|
| 1,830,863 | 11/1931 | Watts | 62/494 |
| 2,287,441 | 6/1942 | McGinnis | 62/494 X |
| 2,307,380 | 1/1943 | Baker | 62/101 |
| 2,548,699 | 4/1951 | Bernat et al. | 62/483 |
| 2,552,071 | 5/1951 | Terrill, Jr. | 62/494 X |
| 2,855,765 | 10/1958 | Smith et al. | 62/494 |
| 3,015,940 | 1/1962 | Harwich | 62/141 X |
| 4,031,712 | 6/1977 | Costello | 62/483 |

Primary Examiner—Lloyd L. King
Attorney, Agent, or Firm—David J. Aston

[57] ABSTRACT

In an absorption refrigeration system comprising a generator, a condenser, an evaporator, an absorber, a heat exchanger, and a compressor to improve generator output and performance, a variable valve on the line from the generator to the absorber is provided to maintain constant cooling output.

9 Claims, 1 Drawing Figure

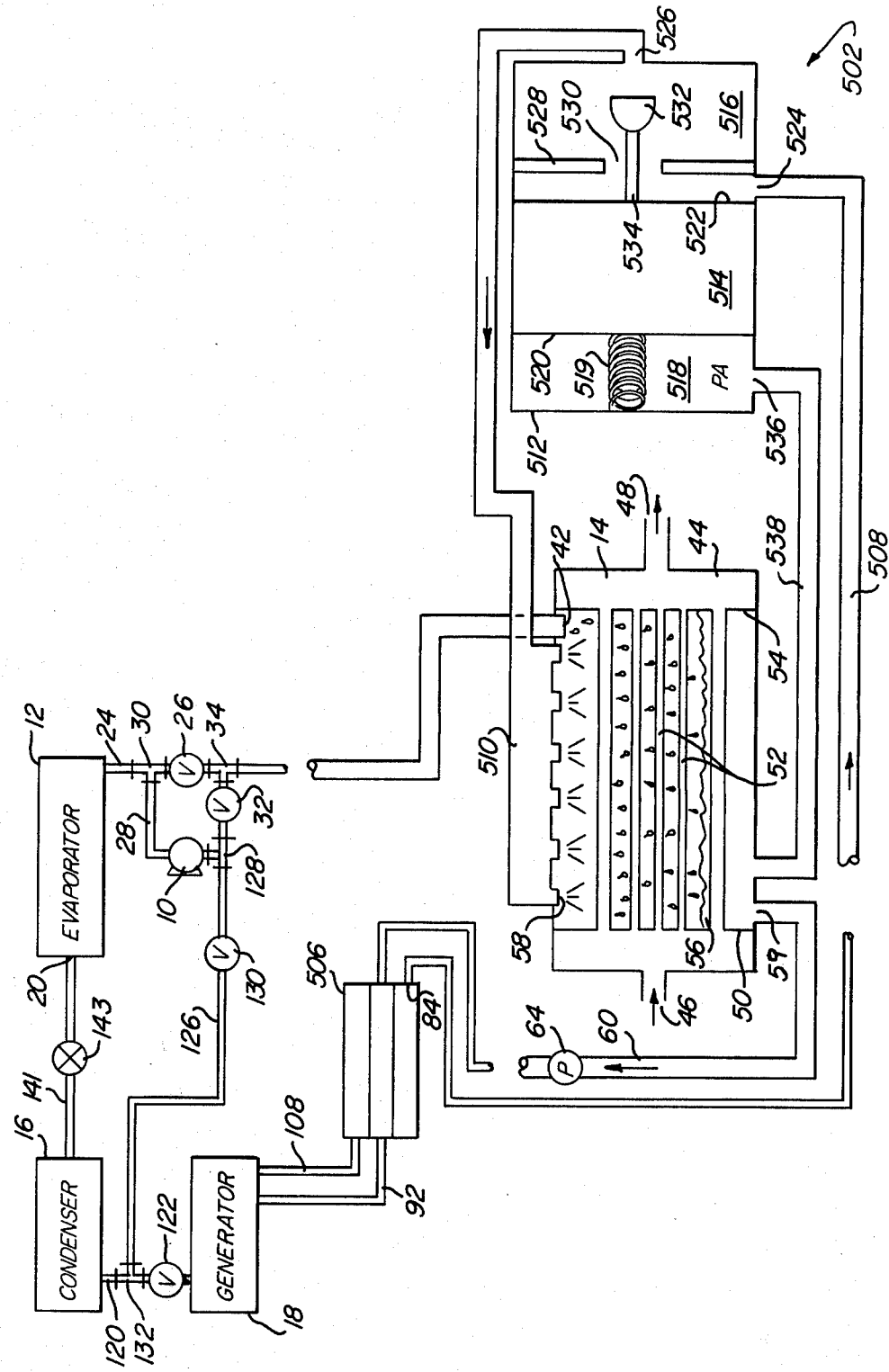

VARIABLE VALVE FOR REFRIGERATION SYSTEM

CROSS REFERENCE TO RELATED APPLICATIONS

The present application is a divisional of U.S. Ser. No. 18,647 filed Mar. 8, 1979, now U.S. Pat. No. 4,285,211, which was a continuation-in-part of U.S. Ser. No. 887,445 filed Mar. 16, 1978, now U.S. Pat. No. 4,171,619.

BACKGROUND OF THE INVENTION

The disclosures of U.S. Ser. No. 18,647 now U.S. Pat. No. 4,285,211 and of U.S. Pat. No. 4,171,619 are hereby incorporated by reference as if fully set forth in the present specification.

The present invention relates to refrigeration systems, and more particularly to an absorption refrigeration system powered by solar energy.

F. A. Costello, in U.S. Pat. No. 4,031,712, describes a combined absoprtion and vapor compression system for solar energy applications. In this system, a compressor is added to a standard generator-condenser—evaporator—absorber loop either between the evaporator and absorber, or between the generator and condenser, or preferably, at both points. A refrigerant line is constructed between the compressors to form a compressor—condenser—evaporator loop.

SUMMARY OF THE INVENTION

A refrigeration system is provided wherein an absorption refrigeration system is compressor assisted. In the preferred embodiment, the compressor is on a line which is connected and valved to other lines so that the compressor may be either bypassed, used to compress vapor passing from the evaporator means to the absorber means, or used as a compressor between the evaporator means and condenser means to provide a vapor compression refrigeration system.

According to the present invention, the flow rate across nozzles in the absorber is varied to produce constant output by a variable flow valve upstream of the nozzles. The variable flow valve comprises a metering chamber with a tapered plug movable in an aperture to increase and decrease the area of the aperture for fluid flow therethrough and pressure difference sensing means responsive to a difference in pressure between absorber pressure and generator pressure and operably connected to the tapered plug for decreasing fluid flow in response to an increase of the difference in pressure.

BRIEF DESCRIPTION OF THE DRAWING

The FIGURE is a diagrammatic view of a refrigeration system with a variable valve means of the present invention.

DESCRIPTION OF THE PREFERRED EMBODIMENT

Referring now to the FIGURE, the presently preferred embodiment of the refrigeration system of the present invention comprises a compressor 10 which is used to compress refrigerant vapor from an evaporator 12 and to output compressed vapor to either an absorber 14 in an absorption cycle or to bypass the absorber and generator 18 and output to a condenser 16 in a vapor compression cycle.

The evaporator 12 comprises a shell formed of metal or other thermally conductive material and comprising an upper inlet opening for receiving vaporizing refrigerant and a lower outlet opening for permitting withdrawal of expanded, vaporized refrigerant. The shell of the evaporator is provided with a number of outwardly extending fins or protruding flat plates which serve to transfer heat which is being absorbed from the surrounding material through the evaporator and to the refrigerant. The surrounding material is the air, water, or other heat transfer fluid which is cooled by the evaporator and circulated to produce the desired cooling effect in the structure to be cooled.

The outlet opening of the evaporator leads to a first line 24 leading to a first valve 26 and from there to the absorber 14. The valve 26, as well as the other valves in the present refrigeration system, may be any device for alternatively permitting or prohibiting the flow of fluid therethrough. Gate valves, ball valves, plug cocks and the like may all be suitably employed. All lines and valves, except as otherwise noted, have similar fluid handling capacities.

A second line 28 joins the first line 24 through a tee connection 30 located in the first line 24 between the evaporator 12 and the first valve 26. The second line 28 passes from the tee connection 30 to the low side of the compressor 10, out through the high side of the compressor and through a second valve 32 to another tee connection 34 located in the first line between the first valve 26 and the absorber 14.

The present invention contemplates the use of a compressor 10 lubricated with oil and, due to inefficient oil retention, discharging oil into the second refrigerant line 28. An oil separation arrangement is provided comprising an oil separation means and a bleed line as described in the above-referenced U.S. Ser. No. 18,647 and U.S. Pat. No. 4,171,619. The presently preferred oiled compressor is of the piston-type, due to the relatively low cost of such compressors. The hermetically sealed, oiled, piston compressor Model AG from Tecumseh Products, Co., Tecumseh, Michigan is especially preferred.

Briefly, to remove oil from the refrigerant vapor, an oil separator is located in the line 28 just downstream from the compressor, and a small bleed line is provided to return refrigerant-absorbant solution back to the second line 28, between the oil separator and the compressor 10. The bleed line is provided because any oil which is not removed by the oil separator will pass into the absorber and become part of the refrigerant solution. Since the oil is not evaporated in the generator, oil would tend to accumulate in the absorber-generator loop if not bled off.

It is important, for purposes of the present invention, that the refrigerant solution be miscible with the compressor oil so that the compressor oil does not float on top of the refrigerant solution and prevent the return of the oil and the volatilization of the refrigerant solution from the crankcase through the piston intake port to the refrigerant line 28. The bleed line enters the refrigerant line 28 between the compressor 10 and the oil separator rather than directly entering the compressor crankcase so that the heat from the compressor discharge can vaporize some of the absorbent and refrigerant from the oil directly into the refrigerant stream.

It is to be understood that types of compressors other than piston compressors may be employed in certain embodiments of the present invention. Certain compressors, such as those which utilize the working fluid for lubrication and have a sealed motor, do not introduce oil into the working fluid and may be used without an oil separation arrangement. A rotary, or helirotor type compressor operates on a constant low level (around 4%) of oil in the working fluid and may be used with only a return bleed line from the absorber output line to the heat exchanger, to the line entering the compressor.

The first line 24 passes from the evaporator to an upper inlet opening 42 of the absorber 14. The absorber 14 comprises an airtight outer shell 44. At the opposite ends of the absorber 14 inlet and outlet openings 46, 48 are provided in the shell for a longitudinal flow of cooling water from a cooling tower or the like (not shown). A baffle plate 50 extends laterally across the interior of the absorber 14 and prevents cooling water from flowing past the plate and through the interior except through a plurality of longitudinally extending tubes 52 which open through the baffle plate. The tubes extend along a substantial length of the absorber and terminate in a second baffle plate 54, similar to the first baffle plate 52, through which the tubes communicate to the outlet opening 48. A header 510 is formed in or fixed on the outside of shell 44 and leads to a number of spray nozzles 58 through which fluid in the header is sprayed into the absorber and onto the longitudinal tubes 52. The vaporized refrigerant from the evaporator 12 is passed through the inlet opening 42 in the absorber and contacts a film of so-called strong solution (i.e., rich in absorbent) from the generator being sprayed from spray nozzles 58. The cool tubes 52 provide a contact surface for the strong solution as it drips onto and over the tubes and provide a favorable environment for absorption of the vaporized refrigerant entering the inlet opening 42 to form reconstituted solution to be recycled to the generator. The reconstituted solution collects in the bottom of the absorber 14 and forms a thin layer 56 of solution covering the lower outlet opening 59 through the absorber shell 44 to prevent the escape of vapor from the absorber. The film 56 and the structural integrity of the shell, as provided for instance by a seamless copper tube, and the tightly fitted spray nozzles 58 and baffle plates 50, 54, permit the absorber 14 to be pressurized by incoming vapor.

The reconstituted solution leaves the absorber through the outlet opening 59 to a line 60 leading to a heat exchager 506. Line 60 has disposed therein a constant delivery solution pump 64 for delivering solution through the heat exchanger to the generator against the vapor pressure in the generator.

The heat exchanger 506 comprises a conventional tube and shell design. The number of small tubes in the heat exchanger should be maximized (on the order of 100) to provide maximum heat transfer surface between the fluid in the main chamber outside the tubes and the fluid flowing countercurrently in the tubes.

Fluid passing out of the tubes in the heat exchanger exits the heat exchanger through an outlet opening 84 in the lateral wall of the heat exchanger and passes through a line 508 to a variable valve 502 as described below and thence to the header 510 of the absorber 14. Fluid from the absorber, meanwhile, flows counter-currently in the main chamber of the heat exchanger to the generator 18 to provide heat exchange between the fluids. A number of heat exchangers may be used in series. A suitable heat exchanger is manufactured by Bell & GOssett ITT of Morton Grove, Illinois. The heat exchanger improves the thermal efficiency of the refrigeration system by transferring heat between the hot, strong solution leaving the generator and the reconstituted solution entering the generator to be boiled.

The generator 18 also comprises a tube and shell design as described in U.S. Pat. No. 4,171,619. Briefly, an outer shell has disposed therein an upper inlet opening connected through a line 92 to the outlet opening of the heat exchanger 506. Fluid from the heat exchanger flows through the inlet opening into the main chamber of the generator, in which a level of boiling solution is maintained. The lateral ends of the main chamber are bounded by baffle plates as in the heat exchanger 506 and absorber 14. Small longitudinal tubes are submerged in the refrigerant solution in the main chamber and carry a hot fluid, such as water, for boiling the solution in the main chamber. As the refrigerant solution in the main chamber is boiled, a refrigerant vapor component and a strong solution component are formed. The strong solution tends to sink towards the bottom of the main chamber and is removed through a bottom outlet opening connected to a line 108 leading to the inlet opening of the heat exchanger 506. The line 92 also contains a tee connection for the bleed line.

A third line 120, containing a third valve 122 passes from an upper opening of the generator 18 to the condenser 16. A fourth line 126 extends from a tee connection 128, located in the second line between the compressor 10 and the second valve 32, through a fourth valve 130 to a tee connection 132 located in the third line 120 between the third valve 122 and the condenser.

The condenser 16 comprises a shell having an upper inlet opening for incoming vapor and a lower outlet opening for condensed liquid. In the interior of the condensor shell is a U-shaped tube passing through the shell. The U-shaped tube carries a cooling stream of a condensing fluid which may be either air or water from a cooling tower or other outside source. The same water used in the absorber tubes 52 may be used in the U-tube.

The condensed liquid flows out of the condenser 16 through the lower outlet opening and into a line 141 which extends between the condenser and the upper inlet opening 20 of the evaporator 12. An expansion device 143, as is known in the art, and which may be an expansion valve, capillary tube, or the like, is interposed in the line 141 between the condenser 16 and the evaporator 12.

In the preferred embodiment of the present invention, a solar collector is used to heat the heat transfer fluid which passes through the small longitudinal tubes in the generator. The solar collector is of the flat plate type. A flat plate type solar collector is a low performance collector, for which the present system is particularly suited. A low performance collector is one which produces less than 220° F. (104° C.) of usable heat energy.

Another type of low performance solar collector which can be used in the refrigeration system of the present invention is the open fluid-film solar collector.

The present refrigeration system can operate in three modes. In the absorption mode, enough heat is provided by the solar collector to efficiently drive the generator 18. The first valve 26 is open; the second valve 32 is shut; the third valve 122 is open; and the fourth valve 130 is shut. The compressor 10 is off, and the solution pump 64 is on. The system is then operating as an absorption refrigeration unit, with refrigerant vapor being evaporated in the generator 18, condensed in the condenser 16, evaporated in the evaporator 12, and absorbed in the absorber 14 back into the strong solution to form a reconstituted solution which is passed countercurrently to the strong solution through the heat exchanger 62. When the energy from the solar collector is insufficient to drive the generator at a C.O.P. in the ideal range, the system operates in the hybrid mode. The first valve 26 is shut; the second valve 32 is open; the third valve 122 is open; and the fourth valve 130 is shut. The compressor 10 and the solution pump 64 are on. The system is now operating as a compressor assisted absorption refrigeration system. The vapor passing from the evaporator to the absorber is compressed, raising the thermal C.O.P. to approximately equal that of the absorption mode as described above. When the solar energy provided to the generator is insufficient to permit maintenance of a thermal C.O.P. in the ideal range even with compressor assistance, the system operates in the vapor compression mode. The first valve 26 is closed; the second valve 32 is closed; the third valve 122 is closed; and the fourth valve 130 is open. The compressor 10 is on and the solution pump 64 is off. Refrigerant now circulates between the evaporator, compressor and condenser as in a vapor compression refrigeration device.

A solenoid-controlled valve is placed on the bleed line to be opened only when the compressor 10 is operating and the solution pump 64 is on, as the flow of solution in the bleed line during the absorption mode would flood the compressor crankcase with refrigerant solution. If the bleed line is open when the system is in the vapor compression mode most of the refrigerant would probably pump down into the absorber loop. The opening and closing of the valves and the switching of the compressor and heat pump are preferably controlled by solenoid valves and relay switches. The valves and switches may be activated in response to temperature changes sensed in the generator or condenser by a thermistor, thermocouple, or the like, wired to a suitable control circuit.

The selection of a suitable refrigerant solution for compressor-internal configurations must be based on certain considerations other than those used in the selection of solutions for prior art absorption-refrigeration devices. Essentially, an absorption refrigeration device can utilize a salt solution, or a solution of any two fluids which have different boiling points. Prior art solutions have been selected primarily on the basis of large negative deviations from Raoult's law (i.e., a low absorbent volume requirement in the absorber and a high heat evolved upon solution) in an effort to minimize solution pump work and necessary heat exchange surfaces, mainly in the heat exchanger. Raoult's law states that for ideal solutions at a given temperature, the vapor pressure of solute over a solution (refrigerant over strong solution) is equal to its vapor pressure in the pure state multiplied by its mole fraction in the solution. If the same partial pressure is provided by a solution with a considerably greater mole fraction of refrigerant, the solution has a negative deviation from Raoult's law. A high heat of solution is characteristic of a high negative deviation. An absorbent required to transport the refrigerant is greatly reduced, reducing pump work, and the size of the recovery heat exchanger. This effect also results in a lower C.O.P., due to the evolution of heat in the absorber which must be replaced in the generator. For purposes of the present invention, a maximum C.O.P. in the absorption refrigeration cycle is desired, making many common solutions unsuitable.

In addition, many known solutions are poisonous or corrosive to pump or compressor components. Ammonia and water, lithium bromide and water, and ammonia and sodium thiocyanate are unsuitable for these reasons. The solution of monomethylamine in sodium thiocyanate also exhibits possible long term corrosion. Corrosion and chemical stability problems are common with compounds having a high heat of vaporization, which is desirable as yielding a high C.O.P. and requiring a low mass circulation rate.

Another, critical, factor in the selection of a refrigerant solution is compatability with the oil separation arrangement discussed above. In order to be compatible with the present oil separation arrangement, the refrigerant and the absorbent must be miscible in and separable by evaporation from the compressor oil. A number of conventional fluid pairs for refrigerant solutions are unacceptable for this reason. For instance, ammonia in water and water in lithium bromide are unacceptable as none of these compounds is soluble in compressor oil. Furthermore, lithium bromide and sodium thiocyanate, used in solutions are not volatile from compressor oil. Dimethy ether of tetraethylene glycol, used in some solutions, cannot be used as it is not volatile enough to be separated from the compressor oil.

The following refrigerants and absorbents meet the above criteria for use in a hybrid absoprtion refrigeration system: dichlorodifluoromethane (F-12) into trichlorotrifluoroethane (F-113); F-12 into trichlorofluoromethane (F-11); and butane into hexane. Based upon all of the foregoing criteria, F-12 into F-113 is preferred above all.

The variable valve means 502 regulates the amount of strong solution which comes from the generator and flows through the heat exchanger 506 to the line 508 passing fluid through the valve means and to the header 510 of the absorber which communicates with a number of spray nozzles for spraying strong solution to mix with refrigerant vapor entering the absorber from the evaporator.

The function of the present variable valve means may best be explained by initial reference to a conventional absorption refrigeration system. In this system, the flow rate across the nozzles in the absorber is constant. This is because the flow across any nozzle, i.e. constricted opening, is governed by the orifice equation:

$$\text{Flow} = k \sqrt{\Delta P A_o} . \qquad \text{Eq. 1}$$

Where
$\Delta P$ = pressure change across nozzle;
$A_o$ = the area of the nozzle orifice; and
$K$ = constant based on orifice geometry.

In the absorber, $\Delta P$ equals the pressure difference between the generator 18, on the high pressure side, and the interior of the absorber 14 on the low pressure side of the system. Although the generator temperature might change with changing solar heat input, the $\Delta P$ in a conventional absorption refrigeration unit is determined by conditions in the condenser 16 and evaporator 20 or the high and low pressure sides, respectively, of the system, which remain constant. In the compressor 10 internal configuration of the present system, however, compressor operation in the hybrid mode changes the balance between the absorber, generator, evaporator, and compressor so that the flow across the absorber must change with changing generator conditions in order to maintain a constant output at the evaporator.

In the hybrid system, the pressure in the absorber rises as the generator temperature drops, due to the effects of the compressor; $\Delta P$ also drops on the nozzle. According to Eq. 1 the flow into the absorber 14 would drop as the generator temperature drops. As generator temperature drops in the hybrid mode, the flow into the absorber 14 should rise if constant output is to be maintained. Required flow increases while the force that determines the flow, $\Delta P$, decreases. Accordingly, the present variable valve means provides a flow to the absorber nozzles 58 which decreases proportionately as $\Delta P$ across the nozzle increases to counteract the effect of Eq. 1. The variable valve provides the proper decrease of flow required for a higher generator temperature and a flow to the absorber nozzle which correspondingly increases as $\Delta P$ decreases at low generator temperatures.

The variable valve 502 may alternatively be used in connection with an absorber wherein refrigerant vapor is sparged into a pool of strong solution. The valve would regulate the flow of solution into the pool to prevent overflow and to provide a sufficient supply of solution to the liquid return pump.

The variable valve 502 comprises a generally cylindrical housing 512 into which is closely fit a reciprocably slidable cylindrical piston 514 which serves to divide the housing longitudinally into a metering chamber 516 and an absorber chamber 518. The chambers are defined by the housing 512 and opposed first and second planar sides 520, 522 of the piston 512. The metering chamber 516 comprises an inlet opening 524 for receiving strong solution from the generator and an outlet opening 526 at a longitudinal end of the housing 512 through which the strong solution passes to the absorber nozzles 58. Between the inlet opening 524 and the outlet opening 526, the metering chamber 516 contains a solid cylindrical plate 528 defining at its center a singular circular aperture 530 through which the strong solution must pass. The area of the aperture available to pass the strong solution is determined by a tapered plug means 532 carried on a stem 534 extending from the second planar side 522 of the piston 514. The tapered plug means 532 is generally parabaloid in shape, but, more specifically, is constructed as a solid of revolution of a curve generated according to Eq. 1 for various generator temperatures. The plug is sized so that at full closure the flow required during the pure absorption mode may pass between the aperture and the plug. The absorber fluid chamber 518 comprises a single inlet opening 536 connected to a line 538 connected to the bottom of the absorber 14. The pressure in the absorber 14 is thus "seen" by the absorber fluid chamber and the second side 520 of the piston associated therewith. In order to see the absorber pressure, the line 538 to the absorber may in fact be connected to any part of the absorber or the absorber lines between the solution pump and the compressor.

A proportional force means is provided by a coil spring 519 connected between the piston 514 and the longitudinal end of the housing 512 to urge the tapered plug 532 longitudinally outwardly from the aperture 530 to increase the area for solution flow as the pressures on either side of the piston become equal. As is known, the displacement of the spring 519 is directly proportional to the force applied thereto.

In the present arrangement the piston 514 is exposed to absorber pressure, PA, on the first side 520 and the pressure of the fluid to be nozzled, i.e. generator solution at a pressure PG on the second side of the piston so that PG and PA act in opposing directions on the piston to give a piston displacement proportional to $\Delta P$ (PG-PA) in Eq. 1. This piston arrangement provides a pressure difference sensing means which is operably connected to the tapered plug 532 to decrease fluid flow in response to a high $\Delta P$.

Modifications of the present variable valve means 502 are possible. For example, pulling coil springs, helical springs, plate springs, etc. may be used, with the shape of the plug and aperture modified to accommodate differing displacement constants. A plate type arrangement, with a plate sliding radially relative to an aperture is also contemplated. Plug means adjacent the inlet opening of the metering chamber are also contemplated.

Although the variable valve means has been described in connection with the preferred embodiment of the FIGURE, it may be used with other compressor internal configurations, such as that shown in FIG. 2 of U.S. Pat. No. 4,171,619, although the shape of the tapered plug will change according to specific operating conditions.

While the present invention has been described in terms of refrigeration, it will be understood that by using a heat transfer fluid surrounding the condenser, and absorber output heating may be obtained in a manner similar to that obtained from a heat pump. It is contemplated that the inventive concepts may be employed in other modifications and constructions of the present invention and it is intended that the following claims be construed to include alternative embodiments except insofar as limited by the prior art.

What is claimed is:

1. In an absorption refrigeration system having generator means, condenser means, evaporator means for cooling output, absorber means, and a compressor for compressing refrigerant vapor passing between said evaporator means and said absorber means, said absorber means comprising means for delivering solution from the generator means to the absorber means, the combination with:

variable valve means between the generator means and the absorber means for controlling fluid flow to said absorber means in response to a pressure difference between said generator means and said absorber means, so that, as absorber pressure approaches generator pressure, said fluid flow to said absorber means increases to maintain a constant cooling output, said variable valve means metering chamber having an aperture with an area for passing absorber fluid; blocking means operatively associated with said aperture for increasing and decreasing effective aperture area for fluid flow through said valve means; and pressure difference sensing means response to a difference in pressure between absorber pressure and generator pressure and operably connected to said blocking means for decreasing said fluid flow in response to an increase of said difference in pressure.

2. The valve means of claim 1 wherein said pressure difference sensing means comprises a piston exposed to absorber pressure on one side and generator pressure on another side, said piston being movable in response to pressures on both of said sides.

3. The valve means of claim 1 wherein said blocking means comprises a plug means which is tapered and moves into and out of said aperture.

4. The absorption refrigeration system of claim 1, further comprising:
a line connecting said compressor and said condenser means for operating said compressor in a vapor compression refrigeration system.

5. The absorption refrigeration system of claim 4 further comprising:
a line bypassing said compressor for operating said absorption refrigeration system without said compressor.

6. The absorption refrigeration system of claim 1 or 4 wherein said compressor is a piston-type compressor.

7. In an absorption refrigeration system having generator means, condenser means, evaporator means for producing cooling output, absorber means, and a compressor for compressing refrigerant passing from said evaporator means to said absorber means, said absorber means comprising nozzle means for spraying fluid to be absorbed, the combination with:
a variable valve for controlling a flow of nozzled fluid at a pressure PG across a nozzle means in said absorber means and comprising:
housing means;
a reciprocably movable piston serving to divide said housing means into a metering chamber and an absorber fluid chamber containing fluid from said absorber means at a pressure PA proportional to pressure in said absorber means;
said metering chamber comprising a means defining an aperture having an area for nozzled fluid flow through said valve;
plug means carried by said piston for reciprocal movement in relation to said aperture to reciprocably increase and decrease said area for nozzled fluid flow through said aperture in response to a reciprocal position of said piston; and
proportional force means for reciprocably urging said plug means to increase said area for nozzled fluid flow as PA approaches PG.

8. The valve means of claim 1 wherein said decreasing of fluid flow occurs to a greater degree, for a given pressure difference, at higher generator pressures.

9. In an absorption refrigeration system having generator means, condenser means, evaporator means for cooling output, absorber means, and a compressor for compressing refrigerant vapor passing between said evaporator means and said absorber means, said absorber means comprising means for delivering solution from the generator means to the absorber means, the combination with:
a variable valve between the generator means and the absorber means for controlling fluid flow to said absorber means, comprising:
an aperture;
first valve operating means for sensing pressure in said generator;
second valve operating means for sensing pressure in said absorber;
blocking means for regulating fluid flow through said aperture and responsive only to said first and second valve operating means, said blocking means being operative so that, as absorber pressure increases relative to generator pressure, said fluid flow is increased proportionately.

* * * * *